United States Patent
Farese et al.

(10) Patent No.: US 7,264,025 B2
(45) Date of Patent: Sep. 4, 2007

(54) OPTIMIZED CRYOGENIC FLUID SUPPLY METHOD

(75) Inventors: David John Farese, Riegelsville, PA (US); Thomas James Sakach, Fleetwood, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/264,058

(22) Filed: Oct. 31, 2005

(65) Prior Publication Data

US 2006/0156743 A1   Jul. 20, 2006

Related U.S. Application Data

(63) Continuation-in-part of application No. 11/039,264, filed on Jan. 20, 2005.

(51) Int. Cl.
*B65B 1/04* (2006.01)

(52) U.S. Cl. .............................. 141/2; 141/82; 141/95; 141/198; 141/231; 62/50.1

(58) Field of Classification Search .................... 141/2, 141/11, 69, 82, 94, 95, 98, 192, 198, 231; 62/48.1, 49.1, 50.1
See application file for complete search history.

(56) References Cited

U.S. PATENT DOCUMENTS

| | | | |
|---|---|---|---|
| 3,369,372 A | 2/1968 | Kleinhaut et al. | |
| 5,107,906 A * | 4/1992 | Swenson et al. | 141/11 |
| 5,409,046 A * | 4/1995 | Swenson et al. | 141/11 |
| 5,615,561 A * | 4/1997 | Houshmand et al. | 62/611 |
| 5,762,119 A | 6/1998 | Platz et al. | |
| 6,745,801 B1 | 6/2004 | Cohen et al. | |
| 7,069,730 B2 * | 7/2006 | Emmer et al. | 62/50.1 |
| 7,128,103 B2 * | 10/2006 | Mitlitsky et al. | 141/248 |
| 2005/0016185 A1 | 1/2005 | Emmer et al. | |
| 2006/0005895 A1 | 1/2006 | Gram et al. | |

FOREIGN PATENT DOCUMENTS

| | | |
|---|---|---|
| DE | 101 07 187 A1 | 8/2002 |
| EP | 1 267 432 A2 | 6/2002 |
| WO | WO 03/059742 A1 | 1/2003 |
| WO | WO 2005/052439 A1 | 6/2005 |

OTHER PUBLICATIONS

European Search Report No. 06000807.5-2425 dated Apr. 28, 2006.

* cited by examiner

*Primary Examiner*—Timothy L. Maust
(74) *Attorney, Agent, or Firm*—Keith D. Gourley

(57) ABSTRACT

A method for supplying a cryogenic fluid to a network of two or more cryogenic fluid receiving stations, wherein a cryogenic liquid is routed to cryogenic fluid receiving stations in a single cryogenic vessel and is dispensed to the cryogenic fluid receiving stations as either a cryogenic liquid, a compressed gas, both a cryogenic liquid and a compressed gas, or as a mixture of a cryogenic liquid and a compressed gas.

34 Claims, 5 Drawing Sheets

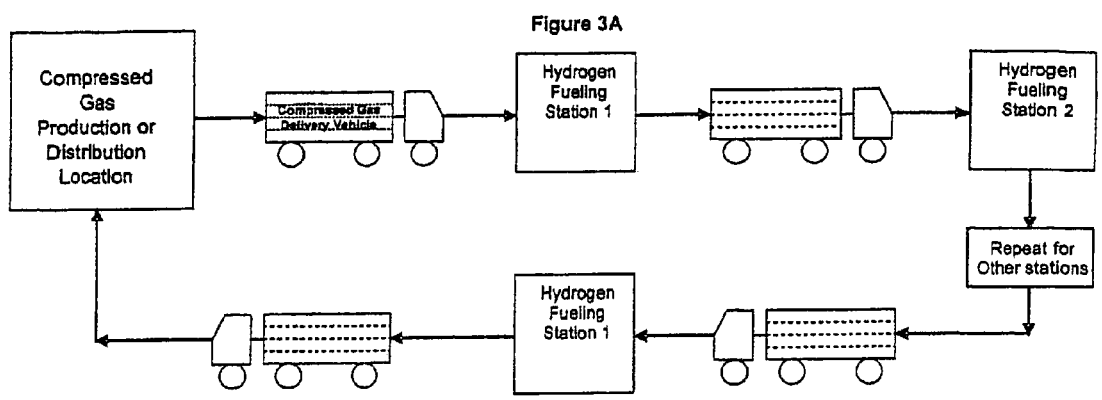
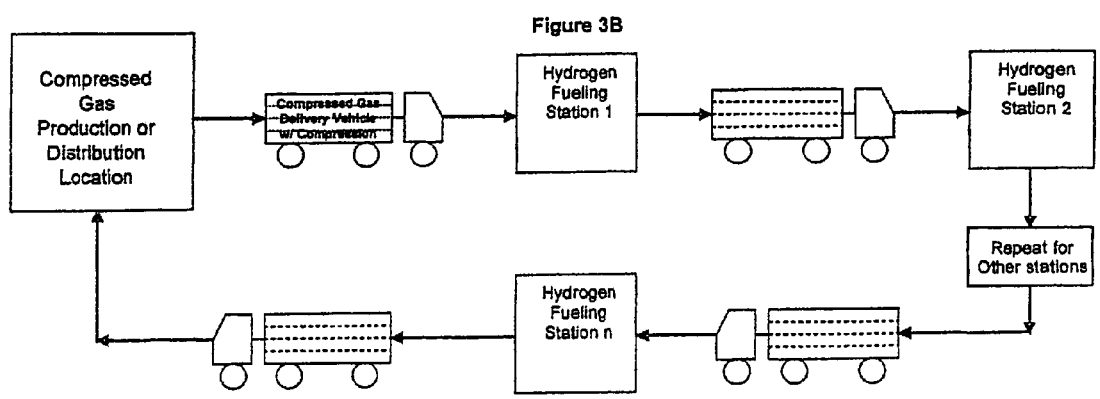

OPTIMIZED CRYOGENIC FLUID SUPPLY METHOD

CROSS-REFERENCE TO RELATED APPLICATIONS

This application is a continuation-in-part application of U.S. patent application Ser. No. 11/039,264, filed Jan. 20, 2005, the complete disclosure of which is hereby incorporated by reference.

BACKGROUND OF THE INVENTION

Cryogenic fluids are typically transported to a receiving station as either a compressed gas or a cryogenic liquid, depending on factors which include cryogenic fluid usage rate and whether the cooling capacity of the liquid cryogenic fluid is needed by the customer. If the cooling capacity of the liquid cryogenic fluid is needed, then a liquid supply is required. If no cooling capacity is needed by the customer, the cryogenic fluid can be delivered as either a liquid or compressed gas. Where there is a high cryogenic fluid consumption rate at a facility, it is preferable to deliver the fluid as a liquid, since a larger quantity of product can be stored for a given vessel volume. Conversely, if the facility's cryogenic fluid usage rate is low, delivering the fluid as a compressed gas is preferred due to the cost of liquefaction.

As illustrated in FIGS. 2A and 2B, cryogenic fluid suppliers typically employ one supply chain or distribution system for the transportation and delivery of a compressed gas and a separate or different supply chain or distribution system for the transportation and delivery of a cryogenic liquid. For example, hydrogen can be supplied to a customer as a liquid from a liquid trailer, or as a compressed gas from cylinders, tube trailers and, in some cases, through a pipeline. When tube trailers are used, hydrogen is often offloaded from the trailers by utilizing a pressure difference between the tubes on the trailer and the receiving tubes or vessels. Alternatively, the entire tube trailer may be dropped off or left behind and exchanged for a depleted or relatively empty tube trailer. Equipment has been designed to allow cryogenic fluids to be transported at high pressures, thereby maximizing the amount of fluid stored on, for example, a trailer. The sequencing or logistics of customer deliveries has also been tailored to minimize the amount of residual gas in tubes when a delivery vehicle returns to a fill station after completing deliveries.

FIGS. 3A and 3B illustrate that in known methods of delivering a cryogenic fluid as a compressed gas, either the delivery vehicle or receiving station must be configured to compress the cryogenic fluid to acceptable pressures (e.g., pressures in the range of around 100-700 bar).

U.S. Pat. No. 3,369,372 ("'372 Patent") describes a liquid helium distribution system. U.S. Pat. No. 5,762,119 ("'119 Patent") describes a cryogenic gas transportation and delivery system for transporting the gas in a liquefied state and delivering it to a storage vessel in a vaporized or gaseous state.

Known cryogenic fluid delivery methods suffer from numerous drawbacks. Having to use two different types of delivery vehicles in order to deliver cryogenic liquids and gases separately is inherently expensive and inefficient: the more delivery vehicles required, the greater the delivery expenses and odds of delivery disruption. Where the maximum allowable working pressure for storage equipment at a compressed gas facility is greater than a delivery vehicle's supply pressure, expensive compression equipment must be maintained at the facility to aid in compressed gas delivery. Also, separate compressed gas and cryogenic liquid supply chains cannot be modified readily to account for changes in the level or type of cryogenic fluid demand at any given cryogenic fluid receiving station.

Accordingly, the need exists for economical methods that enable efficient delivery of both compressed gases and cryogenic liquids to a number of cryogenic fluid receiving stations.

BRIEF SUMMARY OF THE INVENTION

The invention provides methods for supplying a cryogenic fluid to a network of two or more cryogenic fluid receiving stations, the methods comprising:

(a) routing a cryogenic storage vessel containing a liquefied cryogenic fluid to a cryogenic fluid receiving station;

(b) determining whether the cryogenic fluid receiving station is adapted to receive the cryogenic fluid as a cryogenic liquid, a compressed gas, both a cryogenic liquid and a compressed gas, or as a mixture of a cryogenic liquid and a compressed gas;

(c) dispensing the cryogenic fluid from the cryogenic storage vessel to the cryogenic fluid receiving station as a cryogenic liquid, a compressed gas, both a cryogenic liquid and a compressed gas, or a mixture of a cryogenic liquid and a compressed gas in accordance with the determination made in step (b);

(d) (1) determining (i) whether another cryogenic fluid receiving station in the network is in need of cryogenic fluid and (ii) whether the amount of cryogenic fluid remaining in the cryogenic storage vessel is adequate to meet such need, (2) where another cryogenic fluid receiving station in the network is determined to be in need of cryogenic fluid and the amount of cryogenic fluid remaining in the cryogenic storage vessel is determined to be adequate to meet such need, implementing steps (a)-(c) to supply cryogenic fluid to that cryogenic fluid receiving station, or (3) where another cryogenic fluid receiving station in the network is determined to be in need of cryogenic fluid and the amount of cryogenic fluid remaining in the cryogenic storage vessel is determined to be inadequate to meet such need, (i) routing the cryogenic storage vessel to a cryogenic fluid supply facility which dispenses cryogenic fluid to the cryogenic storage vessel, and (ii) thereafter implementing steps (a)-(c) to supply cryogenic fluid to that cryogenic fluid receiving station; and (e) repeating steps (a)-(d) until (1) it is determined that no other cryogenic fluid station in the network is need of cryogenic fluid, or (2) routing of the cryogenic storage vessel within the network is otherwise terminated, wherein cryogenic fluid is dispensed as a compressed gas to a cryogenic fluid receiving station by (1) increasing the pressure of at least a portion of the liquefied cryogenic fluid in the cryogenic liquid storage vessel to a pressure sufficient to form a supercritical fluid; and (2) heating at least a portion of the supercritical fluid, thereby forming a compressed gas.

In one embodiment, the cryogenic storage vessel is disposed on a delivery vehicle which comprises and is regulated by control means which are associated with the cryogenic storage vessel, the one or more cryogenic fluid receiving stations, and the cryogenic fluid supply facility for the transmission, receipt, and analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic fluid in the cryogenic fluid supply facility.

In one embodiment of the invention, cryogenic fluid is dispensed from the cryogenic storage vessel to a cryogenic fluid receiving station as a mixture of cryogenic liquid and a compressed gas.

In still another embodiment of the invention, cryogenic fluid is dispensed from the cryogenic storage vessel to a cryogenic fluid receiving station as both a separate cryogenic liquid stream and a separate compressed gas stream.

In still another embodiment of the invention, cryogenic fluid is dispensed from a cryogenic storage vessel to a cryogenic fluid receiving station as a compressed gas and cryogenic liquid from the cryogenic storage vessel is used to cool the compressed gas during dispensing of the compressed gas from the cryogenic storage vessel to the cryogenic fluid receiving station.

In still another embodiment of the invention, liquefied hydrogen is transported to a hydrogen receiving station and is dispensed from a cryogenic storage vessel to the hydrogen receiving station as a compressed gas. During this process, vaporized hydrogen: (1) is generated by cooling the compressed hydrogen with liquefied hydrogen from the cryogenic storage vessel during dispensing of the compressed hydrogen to the hydrogen receiving station; and/or (2) is delivered to a fuel cell which is positioned on, and provides electric power for, a delivery vehicle upon which the cryogenic storage vessel is disposed.

In still another embodiment of the invention, the pressure of at least a portion of the liquefied cryogenic fluid in the cryogenic storage vessel is increased by a piston-type pump.

In still another embodiment of the invention, cryogenic liquid in the cryogenic storage vessel is depleted until the cryogenic storage vessel only contains residual gaseous cryogenic fluid and at least a portion of the residual gaseous cryogenic fluid is compressed and dispensed to a cryogenic fluid receiving station.

In a still further embodiment of the invention, the cryogenic fluid which is delivered and dispensed to a cryogenic fluid receiving station exists as a liquid at a temperature of greater than around −60° C.

Methods of the invention offer numerous advantages over known processes for delivering cryogenic fluids. Some of these advantages are as follows.

In methods of the invention, a single vehicle may be dispatched in an optimum routing and schedule to deliver a cryogenic liquid, a compressed gas, both a cryogenic liquid and a compressed gas, or a mixture of a cryogenic liquid and a compressed gas to a network of two or more cryogenic fluid receiving stations. Inefficiencies associated with separate cryogenic liquid and compressed gas delivery (e.g., increased number of vehicles and related maintenance and personnel costs) are thereby avoided.

In methods of the invention, compressed gas is delivered from a cryogenic storage vessel at a cryogenic fluid receiving station operating pressure, thereby eliminating the need for costly compressors at the cryogenic fluid receiving station. For example, in one embodiment of the invention, hydrogen gas can be delivered to a hydrogen receiving station at approximately 100-700 bar without using receiving station compressors. Consequently, methods of the invention can use conventional liquefied hydrogen storage vessels to deliver hydrogen gas to hydrogen fueling stations at elevated pressures, e.g., pressures of around 100 bar to around 700 bar.

Another advantage offered by the invention is that conversion of a cryogenic liquid such as liquefied hydrogen to a compressed gas at the cryogenic fluid receiving station improves the purity of the compressed gas.

In certain embodiments of the invention, to improve fill time, minimize cryogenic storage vessel size, and increase the amount of gas delivered, the cryogenic liquid is used to cool the compressed gas during dispensing of the compressed gas from the cryogenic storage vessel to the cryogenic fluid receiving station.

In preferred embodiments, methods of the invention achieve real time optimization of cryogenic fluid delivery to two or more cryogenic fluid receiving stations by continuous analysis of: (1) the amount of cryogenic liquid in the cryogenic storage vessel, (2) the cryogenic liquid or compressed gas demands of the two or more cryogenic fluid receiving stations, and (3) the amount of cryogenic liquid in the cryogenic fluid supply facility. Cryogenic fluid delivery routes and schedules can be varied in real time depending on any number of factors (e.g., variations in cryogenic fluid consumption, cost, and pricing) which affect cryogenic fluid receiving stations, either directly or indirectly.

These and other aspects of the invention are described further in the following detailed description of the invention.

BRIEF DESCRIPTION OF SEVERAL VIEWS OF THE DRAWINGS

FIGS. 3A and 3B illustrate known methods of delivering a cryogenic fluid as a compressed gas.

DETAILED DESCRIPTION OF THE INVENTION

Figure 1:
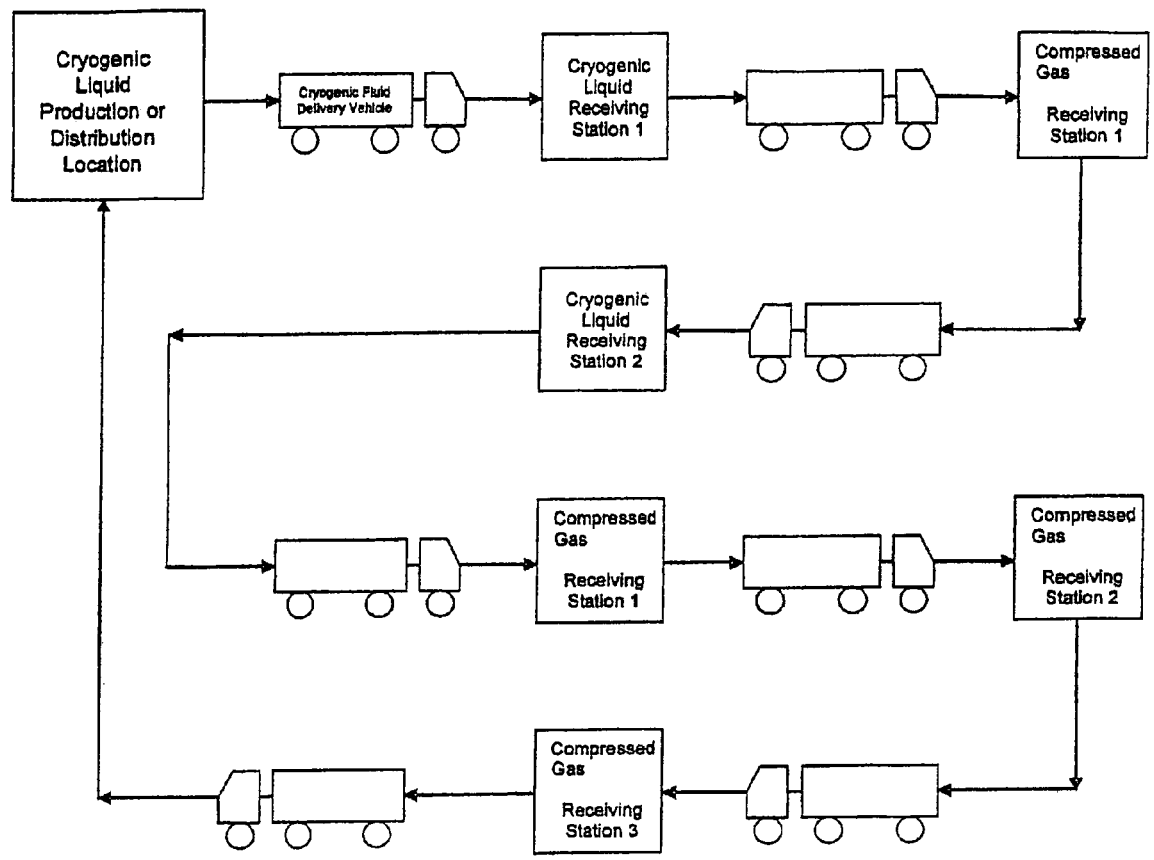
FIG. 1 illustrates one embodiment of a cryogenic fluid delivery method of the invention.
Figure 2A:
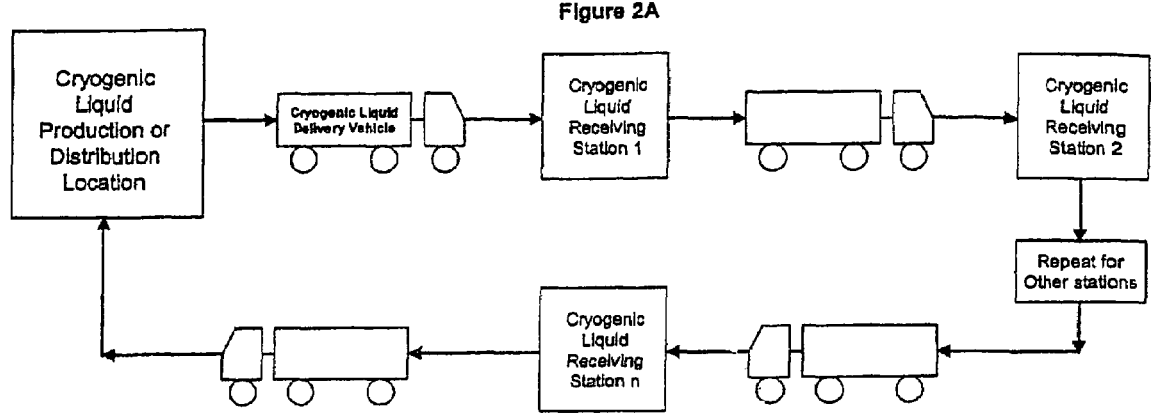
FIGS. 2A and 2B illustrate known cryogenic fluid delivery methods.
Figure 2B:
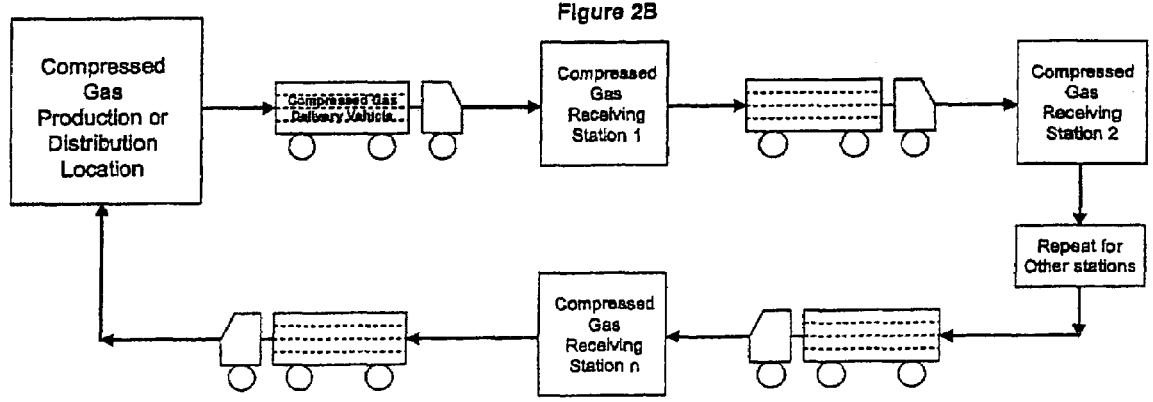

As used herein, the following definitions apply unless noted otherwise.

"Cryogenic fluids" include fluids that liquefy at atmospheric pressure at a temperature of below around −100° C. Hydrogen, helium, argon, oxygen, nitrogen, natural gas, and mixtures of hydrogen and natural gas are examples of such cryogenic fluids. Cryogenic fluids exist as a compressed gas at pressures greater than the fluid's critical pressure and at temperatures greater than around −100° C. (Cryogenic fluid delivered in a tube trailer is typically called a compressed gas, although since it is stored above its critical pressure, it is also a supercritical fluid.)

Carbon dioxide is also considered to be a cryogenic fluid for purposes of the invention.

Cryogenic fluids are delivered to cryogenic fluid receiving stations (as defined hereinafter) as a cryogenic liquid, a compressed gas, both a cryogenic liquid and a compressed gas, or as a mixture of a cryogenic liquid and a compressed gas.

A "compressed gas" is a cryogenic fluid which is at a pressure greater than the cryogenic fluid's critical pressure and which is at a temperature greater than around −100° C.

"Cryogenic fluid receiving stations" include any facilities (e.g., commercial and residential facilities) that use a cryogenic liquid, a compressed gas, both a cryogenic liquid and a compressed gas, or a mixture of a cryogenic liquid and a compressed gas. A cryogenic fluid receiving station can be a hydrogen fueling station, including but not limited to a hydrogen fuel station for vehicles, e.g., as described in U.S. Pat. No. 6,810,925. Two or more cryogenic fluid receiving stations can be adapted to receive compressed gas at two or more different pressures. For example, two or more cryogenic fluid receiving stations are hydrogen receiving stations which are adapted to receive compressed hydrogen gas at two or more pressures ranging from about 100 bar to about 700 bar. "Cryogenic storage vessels" include but are not limited to insulated cryogenic tanks and cryogenic liquid storage vessels that are well-known to those of ordinary skill in the art. Preferably, a pressure buildup system is associated with the cryogenic storage vessel. Cryogenic storage vessels may contain both a cryogenic liquid and a gas in the head space above the cryogenic liquid.

"Delivery vehicles" comprise "mobile support means" (e.g., platforms, pallets, skids, rail cars, and trailers) that are adapted for the support and transportation of cryogenic storage vessels and related apparatus for delivering cryogenic liquids and/or compressed gases to cryogenic fluid receiving stations. The mobile support means can be mounted on or connected for transportation to either a self-propelled transportation means (e.g. trucks, tractor-trailers, aircraft, or ships), or on transportation means which must be moved by separate locomotion (e.g. rail cars, trailers, barges, transportable skids, and the like).

In one embodiment, the cryogenic fluid may be dispensed from the cryogenic storage vessel to the receiving station as a cryogenic liquid, a compressed gas, both a cryogenic liquid and a compressed gas, or a mixture of a cryogenic liquid and a compressed gas using an apparatus described in U.S. patent application Ser. No. 11/039,264, the complete disclosure of which is hereby incorporated by reference. Such an apparatus includes a mobile support means; a cryogenic storage vessel which contains the cryogenic fluid (the cryogenic liquid storage vessel is disposed on the mobile support means); a piston-type pump in fluid communication with the cryogenic storage vessel (the piston-type pump is disposed on the mobile support means); a heat exchanger which is in fluid communication with the piston-type pump and which is disposed to receive the cryogenic fluid from the piston-type pump; a first conduit having a first end and a second end, wherein the first end of the first conduit is in fluid communication with the heat exchanger and is disposed to receive the cryogenic fluid from the heat exchanger, and wherein the second end of the first conduit is in fluid communication with a compressed gas connection fitting; and a second conduit having a first end and a second end, wherein the first end of the second conduit is in fluid communication with the cryogenic storage vessel and is disposed to receive the cryogenic fluid at least in part as a liquid from the cryogenic storage vessel, and wherein the second end of the second conduit is in fluid communication with a liquid cryogenic fluid connection fitting.

A "cryogenic fluid supply facility" can include any facility which stores and optionally generates cryogenic fluids. Cryogenic fluid supply facilities include but are not limited to hydrogen supply depots or production facilities. Means for dispensing cryogenic fluid to the cryogenic storage vessel are described in U.S. patent application Ser. No. 11/039,264 and are well-known to those of ordinary skill in the art.

In one embodiment, during the formation of a compressed gas, supercritical fluids are formed by increasing the pressure of at least a portion of the liquefied cryogenic fluid in the cryogenic storage vessel to a pressure sufficient to form a supercritical fluid using a pump which is located on a delivery vehicle upon which the cryogenic storage vessel is disposed, or which is located at a cryogenic fluid receiving station.

In one embodiment, during the formation of a compressed gas, supercritical fluids are heated by heat exchangers of any chosen design, for example, a finned tube heat exchanger which utilizes heat provided by ambient air. Preferably, the finned tube heat exchanger uses an optional fan to improve heat transfer. In another illustrative embodiment, the heat exchanger may be a hot water shell and tube heat exchanger which uses an electric heater as a heat source. Heat may also be drawn from the engine cooling system of a delivery vehicle. Other suitable heat exchanger designs are known to those of ordinary skill in the art. The heat exchanger is preferably disposed on mobile support means (e.g., delivery vehicle), but can also be positioned adjacent to the mobile support means or can be part of a cryogenic fluid storage facility or cryogenic fluid receiving station.

"Routing a cryogenic storage vessel containing a liquefied cryogenic fluid to a cryogenic fluid receiving station" includes transporting the cryogenic storage vessel containing a liquefied cryogenic fluid by any suitable means to a location from which it can supply cryogenic fluid to a cryogenic fluid receiving station.

Manual (e.g., on-site operator readings or telephone or e-mail communications) or automatic means (e.g., control means as defined hereinafter) can be used to (a) route a cryogenic storage vessel containing a liquefied cryogenic fluid to a cryogenic fluid receiving station; and (b) to transmit, receive, and analyze information that determines, or can be used to determine (1) whether a cryogenic fluid receiving station is adapted to receive the cryogenic fluid as either a cryogenic liquid, a compressed gas, both a cryogenic liquid and a compressed gas, or as a mixture of a cryogenic liquid and a compressed gas; (2) whether another cryogenic fluid receiving station in the network is in need of cryogenic fluid; and (3) whether the amount of cryogenic fluid remaining in the cryogenic storage vessel is adequate to meet such need.

In certain circumstances, routing of a cryogenic storage vessel within a network may be terminated even though other cryogenic fluid station in the network may be in need of cryogenic fluid. For example, delivery vehicle breakdown, or circumstances unrelated to network operation (e.g., weather), may necessitate that the routing being discontinued.

A "network of two or more cryogenic fluid receiving stations" means two or more integrated or separate cryogenic fluid receiving stations which may or may not be under common ownership or control and which may or may not be in communication with one another, whether for the transmission of data relating to cryogenic fluid receiving station cryogenic fluid demands or otherwise.

"Control means" can be associated with the cryogenic storage vessel, the two or more receiving stations, and the cryogenic fluid supply facility for the transmission, receipt, and analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

Control means can include computer systems comprising central processing units (CPU's) for processing data (related to, e.g., the cryogenic liquid or compressed gas levels and consumption rates of one or more cryogenic fluid receiving stations), associated memory media including floppy disks or compact discs (CD's) which may store program instructions for CPU's, one or more display devices such as monitors, one or more alphanumeric input devices such as a keyboard, and one or more directional input devices such as a mouse. Computer systems used in control means can include a computational system memory such as DRAM, SRAM, EDO DRAM, SDRAM, DDR SDRAM, or Rambus RAM, or a non-volatile memory such as a magnetic media (e.g., a hard drive) or optical storage. The memory medium preferably stores a software program or programs for event-triggered transaction processing. The software program(s) may be implemented in any of various ways, including procedure-based techniques, component-based techniques, and/or object-oriented techniques, among others.

Control means can include instrumentation for: (1) monitoring analog input data relating to cryogenic fluid receiving station and cryogenic storage vessel parameters (e.g., e.g., the cryogenic liquid or compressed gas levels and consumption rates of one or more of the cryogenic fluid receiving stations, the cryogenic liquid levels and location of the cryogenic storage vessel, and the cryogenic fluid levels of the cryogenic fluid supply facility); (2) converting such analog input data to CPU input digital signals for CPU processing and generation of CPU digital output signals; and (3) converting CPU digital output signals to analog signals that vary process parameters such as the routing of the cryogenic storage vessel to one or more receiving stations in accordance with CPU digital output signals. Thus, control means can provide real-time, feedback control of the delivery of a cryogenic fluid to a network of two or more cryogenic fluid receiving stations.

In addition to regulating the delivery of a cryogenic fluid to a network of two or more cryogenic fluid receiving stations in response to cryogenic fluid receiving station and storage vessel parameters, control means can, through hard-wired or wireless transmission, receive and respond to external data that do not relate to cryogenic fluid receiving station and cryogenic storage vessel parameters. Such external data include but are not limited to: wireless transmissions from on-board hydrogen vehicle fuel monitor sensors which alert a delivery vehicle upon which a cryogenic storage vessel is disposed to the hydrogen fuel levels of vehicles in its vicinity; cryogenic fluid cost and pricing; external inventory levels; projected weather conditions; and projected peak cryogenic fluid consumption times. Control means can also be associated with external databases (e.g., financial institution databases or emergency response databases that are located remotely from the cryogenic storage vessel, the two or more cryogenic fluid receiving stations, and the cryogenic fluid supply facility) for the transmission of data which does not relate to network and cryogenic storage vessel parameters to enable, e.g., (1) real-time commodity pricing or investment decisions or (2) decisions regarding the continuation or termination of cryogenic fluid deliveries based on, e.g., network cryogenic fluid consumption or pricing, or external events such as an accident, blackout, natural disaster, terrorist threat, or attack.

In one embodiment, regulation of a delivery vehicle upon which a cryogenic storage vessel is disposed by the control means includes routing the delivery vehicle to two or more cryogenic fluid receiving stations using a delivery route and delivery schedule determined at least in part by analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

In another embodiment, the delivery route and delivery schedule are determined before the delivery vehicle is routed to any cryogenic fluid receiving station.

In another embodiment, the delivery vehicle delivery route and delivery schedule are altered after the delivery vehicle is routed to a cryogenic fluid receiving station.

In another embodiment, the delivery vehicle delivery route and delivery schedule are altered based at least in part by analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

In another embodiment, the delivery vehicle delivery route and delivery schedule are altered based at least in part by analysis of data that does not reflect one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

FIG. 1 illustrates one embodiment of a cryogenic fluid delivery method of the invention.

Referring to FIG. 1, a cryogenic fluid delivery vehicle comprising a cryogenic storage vessel filled with a cryogenic liquid departs a cryogenic fluid supply facility and is routed to cryogenic liquid receiving station 1. It is determined that cryogenic liquid receiving station 1 is adapted to receive cryogenic liquid and cryogenic liquid is dispensed to cryogenic liquid receiving station 1.

It is determined that compressed gas receiving station 1 is in need of compressed gas and that the amount of cryogenic liquid remaining in the cryogenic storage vessel of the cryogenic fluid delivery vehicle is adequate to meet such need. The cryogenic fluid delivery vehicle is then routed to compressed gas receiving station 1, a determination is made that compressed gas receiving station 1 is adapted to receive compressed gas, and compressed gas is dispensed to compressed gas receiving station 1 by: (1) increasing the pressure of at least a portion of the cryogenic liquid in the cryogenic storage vessel to a pressure sufficient to form a supercritical fluid; and (2) heating at least a portion of the supercritical fluid, thereby forming a compressed gas.

It is also determined that cryogenic liquid receiving station 2 is in need of cryogenic liquid and that the amount of cryogenic liquid remaining in the cryogenic storage vessel of the cryogenic fluid delivery vehicle is adequate to meet such need. The cryogenic fluid delivery vehicle is then routed to cryogenic liquid receiving station 2, a determination is made that cryogenic liquid receiving station 2 is adapted to receive cryogenic liquid, and cryogenic liquid is dispensed to cryogenic liquid receiving station 2.

It is also determined that compressed gas receiving station 2 is in need of compressed gas and that the amount of cryogenic liquid remaining in the cryogenic storage vessel of the cryogenic fluid delivery vehicle is adequate to meet such need. The cryogenic fluid delivery vehicle is then routed to compressed gas receiving station 2, a determination is made that compressed gas receiving station 2 is adapted to receive compressed gas, and compressed gas is dispensed to compressed gas receiving station 2 by (1) increasing the pressure of at least a portion of the cryogenic liquid in the cryogenic liquid storage vessel to a pressure sufficient to form a supercritical fluid; and (2) heating at least a portion of the supercritical fluid, thereby forming a compressed gas.

It is also determined that compressed gas receiving station 3 is in need of compressed gas and that the amount of cryogenic liquid remaining in the cryogenic storage vessel of the cryogenic fluid delivery vehicle is adequate to meet such need. The cryogenic fluid delivery vehicle is then routed to compressed gas receiving station 3, a determination is made that compressed gas receiving station 3 is adapted to receive compressed gas, and compressed gas is dispensed to compressed gas receiving station 3 by (1) increasing the pressure of at least a portion of the cryogenic liquid in the cryogenic liquid storage vessel to a pressure sufficient to form a supercritical fluid; and (2) heating at least a portion of the supercritical fluid, thereby forming a compressed gas.

It is also determined after the delivery of compressed gas to compressed gas receiving station 3 that either: (1) the amount of cryogenic liquid remaining in the cryogenic storage vessel of the cryogenic fluid delivery vehicle is inadequate to meet any additional cryogenic liquid demands of either cryogenic liquid receiving stations 1 and 2, or that there are no such additional demands; or (2) that the amount of cryogenic liquid remaining in the cryogenic storage vessel of the cryogenic fluid delivery vehicle is inadequate to meet any additional compressed gas demands of compressed gas receiving stations 1-3, or that there are no such additional demands. The cryogenic fluid delivery vehicle is then routed to, and refueled at, the cryogenic fluid supply facility.

The determinations as to the cryogenic fluid demands of any cryogenic fluid receiving station, or the determinations as to whether a cryogenic fluid receiving station is adapted to receive a cryogenic liquid, a compressed gas, both a cryogenic liquid and a compressed gas, or a mixture of a cryogenic liquid and compressed gas, can be made prior to, during, or after the routing of the cryogenic storage vessel to any given cryogenic fluid receiving station. For example, a preprogrammed delivery vehicle route can be altered in real time to account for fluctuations in cryogenic fluid demand at one or more cryogenic fluid receiving stations, or can be varied during the course of delivery based on external events such a traffic disruptions, price differentials between cryogenic liquids and compressed gases, and weather conditions.

In the event that the cryogenic fluid supply facility from which the cryogenic storage vessel was initially fueled is unable to supply adequate amounts of cryogenic fluid after the initial fueling, the delivery vehicle may be routed to one or more alternative cryogenic fluid supply facilities.

Figure 4:
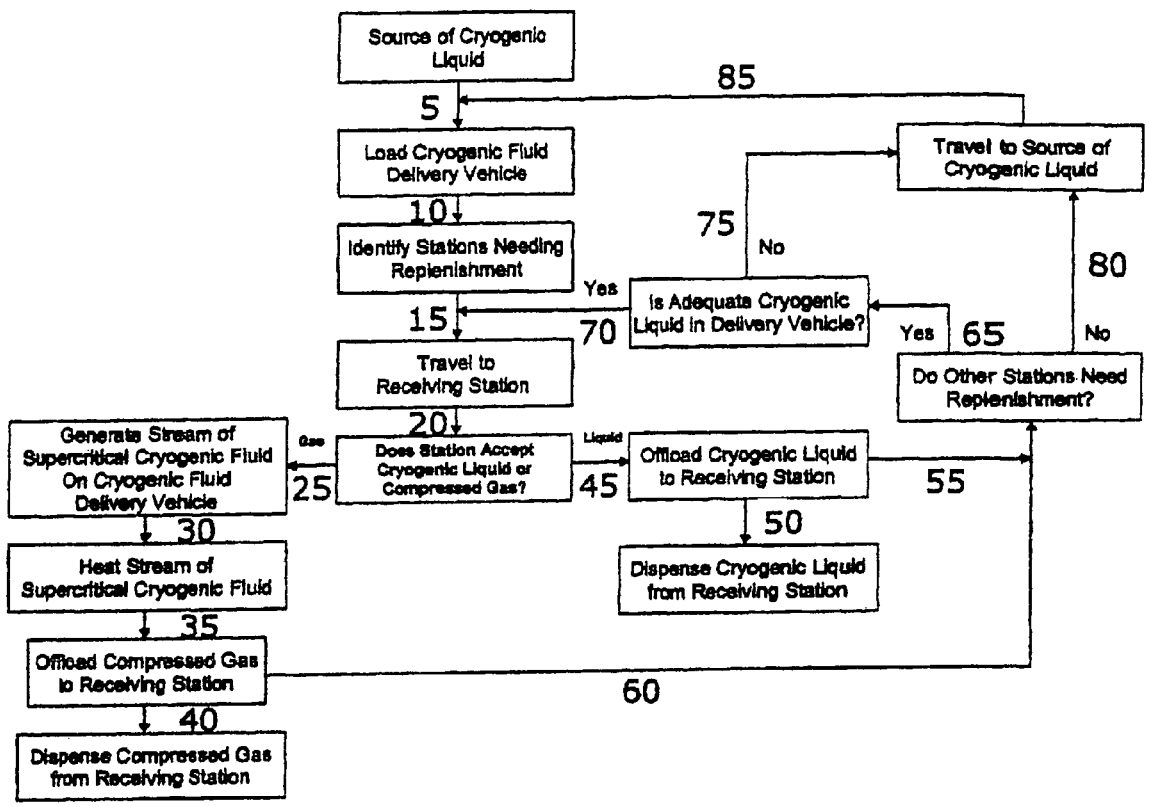
FIG. 4 is a flowchart which illustrates the delivery of a cryogenic liquid and a compressed gas in one embodiment of the invention.

FIG. 4 is a flowchart which illustrates the delivery of a cryogenic liquid and compressed gas in accordance with one embodiment of the invention. Referring to FIG. 4, cryogenic liquid is dispensed 5 from a cryogenic fluid supply facility into the cryogenic storage vessel of a delivery vehicle. A cryogenic fluid receiving station in need of cryogenic liquid or compressed gas is identified 10. The cryogenic liquid delivery vehicle is routed 15 to that receiving station; it is determined 20 whether the station is adapted to receive and is in need of compressed gas or cryogenic liquid. If it is determined that the receiving station is adapted to receive and is in need of compressed gas, a supercritical stream of cryogenic fluid is generated 25 by increasing 30 the pressure of at least a portion of the cryogenic liquid in the cryogenic storage vessel, and by heating 35 the supercritical stream of cryogenic fluid to generate a compressed gas. The compressed gas is then dispensed (off-loaded) 40 to the receiving station, and is subsequently dispensed 50 from the receiving station to various end users.

As illustrated in FIG. 4, if it is determined 20 that the cryogenic fluid receiving station is adapted to receive and is in need of cryogenic liquid, cryogenic liquid is dispensed 45 to the receiving station, and is subsequently dispensed from the receiving station to various end users.

It is then determined (55 and 60) whether any other receiving station is in need of either compressed gas or cryogenic liquid and if there is such a need, it determined 65 whether the amount of cryogenic liquid remaining in the cryogenic storage vessel of the cryogenic fluid delivery vehicle is adequate to meet such demand. If the amount of cryogenic liquid remaining in the cryogenic storage vessel of the cryogenic fluid delivery vehicle is determined 65 to be adequate to meet the compressed gas or cryogenic liquid demands of another receiving station, the cryogenic fluid delivery vehicle is routed 70 to that station. If it is determined 75 that the cryogenic liquid remaining in the cryogenic storage vessel is inadequate to meet the compressed gas or cryogenic liquid demands of another station, or if it is determined 80 that no additional station is in need of compressed gas or cryogenic liquid, the cryogenic fluid delivery vehicle is routed 85 to a cryogenic fluid supply facility.

Figure 5:
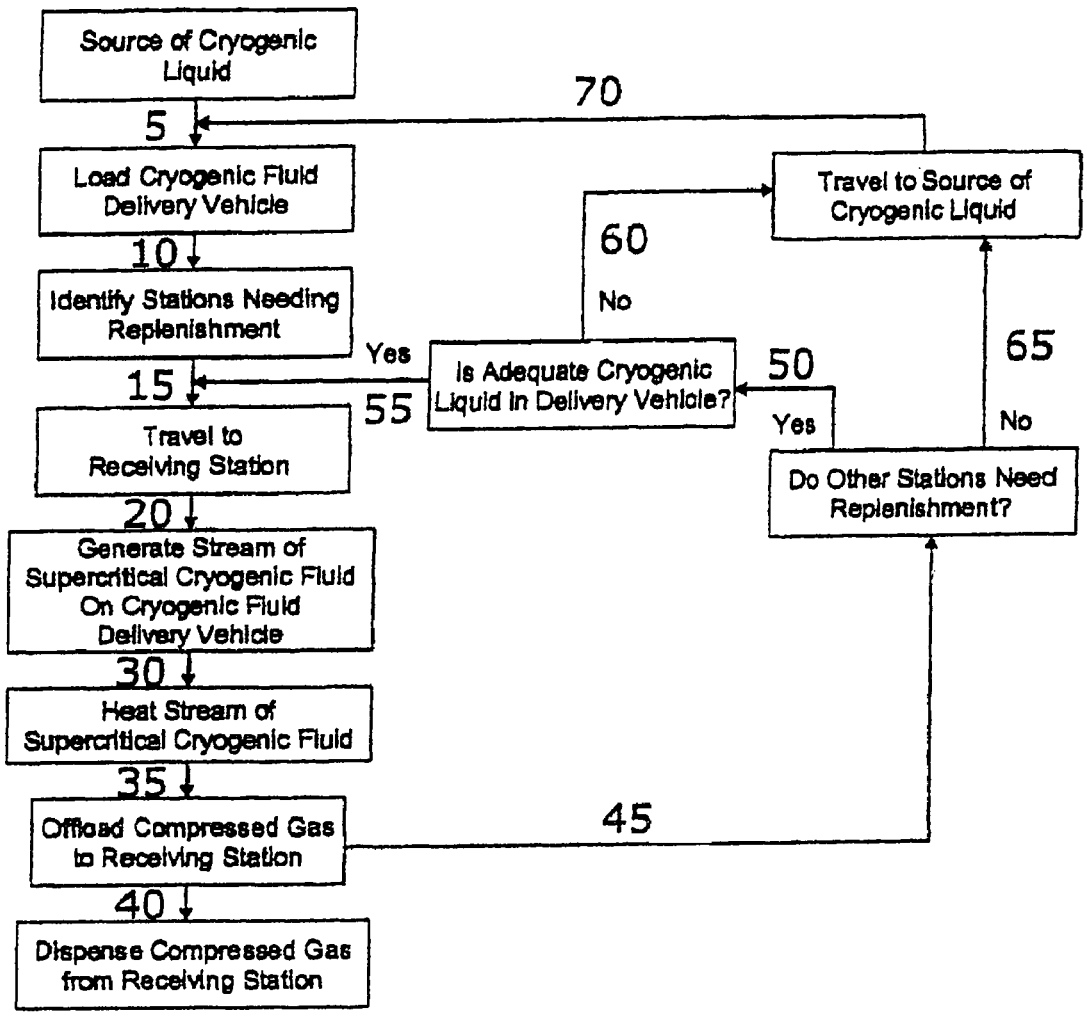
FIG. 5 is a flowchart which illustrates the delivery of a compressed gas in one embodiment of the invention.

FIG. 5 is a flowchart which illustrates the delivery of a compressed gas in accordance with one embodiment of the instant invention. Referring to FIG. 5, cryogenic liquid is dispensed 5 from a cryogenic fluid supply facility into the cryogenic storage vessel of a delivery vehicle. A compressed gas receiving station in need of compressed gas is identified 10; the delivery vehicle is routed 15 to that receiving station. A supercritical stream of cryogenic fluid is generated 20 by increasing the pressure of at least a portion of the cryogenic liquid in the cryogenic storage vessel, and by heating 30 the supercritical stream of cryogenic fluid to generate a compressed gas. The compressed gas is then dispensed 35 to the compressed gas receiving station, and is subsequently dispensed 40 from the receiving station to various end users.

After dispensing the compressed gas to the receiving station, it is determined 45 whether any other compressed gas receiving station is in need of compressed gas and if there is such a need, it determined 50 whether the amount of cryogenic liquid remaining in the cryogenic storage vessel of the cryogenic fluid delivery vehicle is adequate to meet such demand. If the amount of cryogenic liquid remaining in the cryogenic storage vessel of the cryogenic fluid delivery vehicle is adequate to meet the compressed gas demands of another receiving station, the cryogenic fluid delivery vehicle is routed 55 to that station. If it is determined 60 that the cryogenic liquid remaining in the cryogenic storage vessel of the cryogenic fluid delivery vehicle is inadequate to meet the compressed gas demands of another compressed gas receiving station, or if it is determined 65 that no additional station is in need of compressed gas, the cryogenic fluid delivery vehicle is routed 70 to a cryogenic fluid supply facility.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for supplying a cryogenic fluid to a network of two or more cryogenic fluid receiving stations, the method comprising:
   (a) routing a cryogenic storage vessel containing a liquefied cryogenic fluid to a cryogenic fluid receiving station;
   (b) determining whether the cryogenic fluid receiving station is adapted to receive the cryogenic fluid as either a cryogenic liquid, a compressed gas, both a cryogenic liquid and a compressed gas, or as a mixture of a cryogenic liquid and a compressed gas;
   (c) dispensing the cryogenic fluid from the cryogenic storage vessel to the cryogenic fluid receiving station as either a cryogenic liquid, a compressed gas, both a cryogenic liquid and a compressed gas, or as a mixture of a cryogenic liquid and a compressed gas in accordance with the determination made in step (b);
   (d) (1) determining (i) whether another cryogenic fluid receiving station in the network is in need of cryogenic fluid and (ii) whether the amount of cryogenic fluid remaining in the cryogenic storage vessel is adequate to meet such need, (2) where another cryogenic fluid receiving station in the network is determined to be in need of cryogenic fluid and the amount of cryogenic fluid remaining in the cryogenic liquid storage vessel is determined to be adequate to meet such need, implementing steps (a)-(c) to supply cryogenic fluid to that cryogenic fluid receiving station, or (3) where another cryogenic fluid receiving station in the network is determined to be in need of cryogenic fluid and the amount of cryogenic fluid remaining in the cryogenic storage vessel is determined to be inadequate to meet such need, (i) routing the cryogenic storage vessel to a cryogenic fluid supply facility which dispenses cryogenic fluid to the cryogenic storage vessel, and (ii) thereafter implementing steps (a)-(c) to supply cryogenic fluid to that cryogenic fluid receiving station; and
   (e) repeating steps (a)-(d) until (1) it is determined that no other cryogenic fluid receiving station in the network is need of cryogenic fluid, or (2) routing of the cryogenic storage vessel within the network is otherwise terminated; wherein cryogenic fluid is in dispensed as a compressed gas to a cryogenic fluid receiving station by (1) increasing the pressure of at least a portion of the liquefied cryogenic fluid in the cryogenic storage vessel to a pressure sufficient to form a supercritical fluid; and (2) heating at least a portion of the supercritical fluid, thereby forming a compressed gas.

2. A method of claim 1, wherein cryogenic fluid is dispensed from the cryogenic storage vessel to a cryogenic fluid receiving station as a mixture of a cryogenic liquid and a compressed gas.

3. A method of claim 1, wherein the cryogenic fluid is dispensed from the cryogenic storage vessel to a cryogenic fluid receiving station as a compressed gas.

4. A method of claim 3, wherein cryogenic liquid from the cryogenic storage vessel is used to cool the compressed gas as the compressed gas is dispensed to the cryogenic fluid receiving station.

5. A method of claim 4, wherein: (a) the cryogenic fluid is hydrogen; (b) the cryogenic storage vessel is disposed on a delivery vehicle; (c) cooling of the compressed gas generates a hydrogen vapor stream; and (d) the hydrogen vapor stream is delivered to a fuel cell which is positioned on, and provides electric power for, the delivery vehicle.

6. A method of claim 1, wherein the cryogenic fluid is a liquid at temperatures of greater than around −600° C.

7. A method of claim 1, wherein the cryogenic fluid is selected from the group consisting of hydrogen, helium, argon, oxygen, nitrogen, natural gas, mixtures of hydrogen and natural gas, and carbon dioxide.

8. A method of claim 1, wherein the cryogenic storage vessel is disposed on a delivery vehicle which is regulated by control means which are associated with the delivery vehicle and cryogenic storage vessel, the two or more cryogenic fluid receiving stations, and the cryogenic fluid supply facility for the transmission, receipt, and analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

9. A method of claim 1, wherein the cryogenic storage vessel is disposed on a delivery vehicle.

10. A method of claim 8, wherein the control means are associated with a database which: (a) is located remotely from the cryogenic storage vessel, the two or more cryogenic fluid receiving stations, and the cryogenic fluid supply facility; and (b) which is communication with the control means for the transmission, receipt, and analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

11. A method of claim 8, wherein the control means are associated with a database which: (a) is located remotely from the cryogenic storage vessel, the one or more cryogenic fluid receiving stations, and the cryogenic fluid supply facility; and (b) which is communication with the control means for the transmission, receipt, and analysis of data which does not relate to the following values: (1) the amount of cryogenic liquid in the cryogenic storage vessel, (2) the cryogenic liquid or compressed gas demands of the one or more cryogenic fluid receiving stations, and (3) the amount of cryogenic fluid in the cryogenic fluid supply facility.

12. A method of claim 1, wherein the supercritical fluid is heated by a heat exchanger which is located either (a) on a delivery vehicle which transports the cryogenic storage vessel to a cryogenic fluid receiving station, or (b) at a cryogenic fluid receiving station.

13. A method of claim 1, wherein a cryogenic liquid, a compressed gas, or a mixture of a cryogenic liquid and a compressed gas is dispensed from the cryogenic storage vessel to a cryogenic fluid receiving station using an apparatus comprising:
   a mobile support means upon which the cryogenic storage vessel is disposed
   a piston-type pump which is in fluid communication with the cryogenic storage vessel and which is disposed on the mobile support means;
   a heat exchanger which is in fluid communication with the piston-type pump and which is disposed to receive the cryogenic fluid from the piston-type pump;
   a first conduit having a first end and a second end, wherein the first end of the first conduit is in fluid communication with the heat exchanger and is disposed to receive the cryogenic fluid from the heat exchanger, and wherein the second end of the first conduit is in fluid communication with a compressed gas connection fitting; and a second conduit having a first end and a second end wherein the first end of the second conduit is in fluid communication with the cryogenic storage vessel and disposed to receive the cryogenic fluid at least in part as a liquid from the cryogenic storage vessel, and wherein the second end of the second conduit is in fluid communication with a liquid cryogenic fluid connection fitting.

14. A method of claim 1, wherein the pressure of at least a portion of the liquefied cryogenic fluid in the cryogenic storage vessel is increased by a piston-type pump.

15. A method of claim 1, wherein cryogenic liquid in the cryogenic storage vessel is depleted until the cryogenic storage vessel only contains residual gaseous cryogenic fluid and at least a portion of the residual gaseous cryogenic fluid is compressed and dispensed to a cryogenic fluid receiving station.

16. A method of claim 1, wherein at least one cryogenic fluid receiving station is adapted to receive both a cryogenic liquid and a compressed gas.

17. A method of claim 1, wherein two or more cryogenic fluid receiving stations are adapted to receive compressed gas at two or more different pressures.

18. A method of claim 16, wherein two or more cryogenic fluid receiving stations are hydrogen receiving stations which are adapted to receive compressed hydrogen gas at two or more pressures ranging from about 100 bar to about 700 bar.

19. A method of claim 1, wherein the cryogenic storage vessel receives cryogenic fluid from two or more cryogenic fluid supply facilities.

20. A method of claim 12, wherein the heat exchanger is a finned tube heat exchanger or a hot water shell and tube heat exchanger.

21. A method of claim 20, wherein the heat exchanger is mounted on a delivery vehicle which transports the cryogenic storage vessel to a cryogenic fluid receiving station.

22. A method of claim 8, wherein regulation of the delivery vehicle by the control means includes routing the delivery vehicle to two or more cryogenic fluid receiving stations using a delivery route and delivery schedule determined at least in part by analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

23. A method of claim 22, wherein the delivery route and delivery schedule are determined before the delivery vehicle is routed to any cryogenic fluid receiving station.

24. A method of claim 22, wherein the delivery route and delivery schedule are altered after the delivery vehicle is routed to a cryogenic fluid receiving station.

25. A method of claim 22, wherein the delivery route and delivery schedule are altered based at least in part by analysis of data reflecting one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

26. A method of claim 22, wherein the delivery route and delivery schedule are altered based at least in part by analysis of data that does not reflect one or more of the following values: (1) the amount of cryogenic liquid in the cryogenic storage vessel, (2) the cryogenic liquid or compressed gas demands of the one or more cryogenic fluid receiving stations, and (3) the amount of cryogenic liquid in the cryogenic fluid supply facility.

27. A method of claim 1, wherein, during formation of a compressed gas, the pressure of at least a portion of the liquefied cryogenic fluid in the cryogenic storage vessel is increased to a pressure sufficient to form a supercritical fluid using a pump which is located on a delivery vehicle upon which the cryogenic tank is disposed.

28. A method of claim 1, wherein, during formation of a compressed gas, the pressure of at least a portion of the liquefied cryogenic fluid in the cryogenic storage vessel is increased to a pressure sufficient to form a supercritical fluid using a pump which is located at a cryogenic fluid receiving station.

29. A method of claim 21, wherein the delivery vehicle which transports the cryogenic storage vessel to a cryogenic fluid receiving station also includes a pump which is used to increase the pressure of at least a portion of the liquefied cryogenic fluid in the cryogenic storage vessel to a pressure sufficient to form the supercritical fluid.

30. A method of claim 21, wherein the delivery vehicle is a truck.

31. A method of claim 1, wherein one or more of the cryogenic fluid receiving stations is a hydrogen fuel station for vehicles.

32. A method of claim 2, wherein one or more of the cryogenic fluid receiving stations is a hydrogen fuel station for vehicles.

33. A method of claim 3, wherein one or more of the cryogenic fluid receiving stations is a hydrogen fuel station for vehicles.

34. A method of claim 12, wherein one or more of the cryogenic fluid receiving stations is a hydrogen fuel station for vehicles.

* * * * *

UNITED STATES PATENT AND TRADEMARK OFFICE
CERTIFICATE OF CORRECTION

PATENT NO. : 7,264,025 B2
APPLICATION NO. : 11/264058
DATED : September 4, 2007
INVENTOR(S) : David John Farese and Thomas James Sakach It is certified that error appears in the above-identified patent and that said Letters Patent is hereby corrected as shown below:

Column 11, Line 44

In claim 1 delete the word "in"

Column 12, Line 2

In claim 6 delete the word "-600°C" and insert -- -60°C --

Column 12, Line 57

In claim 13 insert -- ; -- after "disposed"

Signed and Sealed this

Twenty-seventh Day of November, 2007

JON W. DUDAS
*Director of the United States Patent and Trademark Office*